United States Patent Office 3,462,452
Patented Aug. 19, 1969

3,462,452
1-PHENETHYL OR p-AMINOPHENETHYL-3-(m-HY-DROXY- OR ALKANOYLOXY-PHENYL)-3-PRO-PYLPYRROLIDINES AND SALTS THEREOF
John Frederick Cavalla, Isleworth, England, assignor to Parke, Davis & Company, Detroit, Mich., a corporation of Michigan
No Drawing. Filed May 17, 1966, Ser. No. 550,615
Int. Cl. C07d 27/04; A61k 27/00
U.S. Cl. 260—326.5                                        5 Claims

ABSTRACT OF THE DISCLOSURE 1-phenethyl and 1-(p-aminophenethyl)-3-(m-hydroxyphenyl)-3-propylpyrrolidines; lower alkanoic acid esters thereof; and salts of the foregoing compounds. These compounds have pharmacological properties, especially as analgesic agents. The phenols can be prepared by cleaving or hydrolyzing the corresponding ethers and esters. The esters can be prepared by introducing a phenethyl group on the pyrrolidino nitrogen atom or by esterifying a phenol. The p-aminophenethyl compounds of both the phenol and ester series can also be prepared by reducing the corresponding p-nitrophenethyl compounds.

---

The present invention relates to new pyrrolidine compounds. More particularly, the invention relates to new 1-aralkyl-3-aryl-3-propylpyrrolidine compounds of the formula

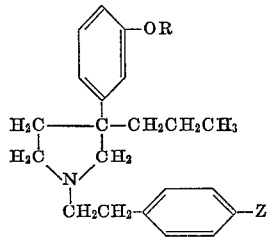

to salts thereof, and to methods for the production of the foregoing compounds; where R represents hydrogen or lower alkanoyl, and Z represents hydrogen or amino (—NH$_2$). When R represents lower alkanoyl, it is an alkanoyl radical of not more than 4 carbon atoms.

In accordance with the invention, the compounds of the foregoing formula wherein R represents lower alkanoyl and their salts can be produced by reacting a pyrrolidine compound having in free base form the formula

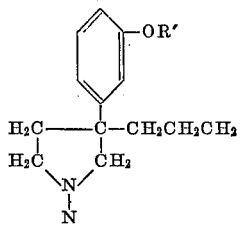

with a phenethyl halide of the formula

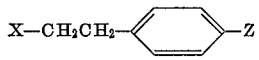

where R' represents lower alkanoyl; X represents halogen, preferably chlorine or bromine; and Z is as defined before and thus represents hydrogen or amino. However for high yields and in order that competing side-reactions are minimized, best results in this process are obtained when Z represents hydrogen. The pyrrolidine compound and the phenethyl halide can be employed in approximately equimolar quantities although it is desirable to employ up to a moderate excess of the phenethyl halide. The process is carried out in any of a variety of unreactive solvents. Some examples of suitable solvents are ethers such as diethyl ether, diisopropyl ether, diethylene glycol dimethyl ether, dioxane, and tetrahydrofuran; hydrocarbons such as benzene, toluene, xylene, and petroleum ether; tertiary amides such as dimethylformamide, N,N - dimethylacetamide, N - methyl-2-pyrrolidone; and lower alkanols such as methanol, ethanol, and isopropyl alcohol. A preferred solvent is dimethylformamide. The time and temperature of the reaction are not critical and it is customary to carry out the reaction at room temperature for up to about 24 hours. If desired temperatures up to about 150° C. with shorter reaction times can also be used. The reaction is preferably carried out in the presence of at least the calculated amount of a base such as sodium carbonate, potassium carbonate, or potassium bicarbonate which reacts with the hydrogen halide formed as a by-product. It is preferred to use low temperatures and to add the base in small portions as the reaction proceeds. The product is isolated either as the free base or as an acid-addition salt by adjustment of the pH as required.

Also in accordance with the invention, the phenols of the invention, that is, the compounds wherein R represents hydrogen, and salts thereof, can be produced by reacting a compound having in free base form the formula

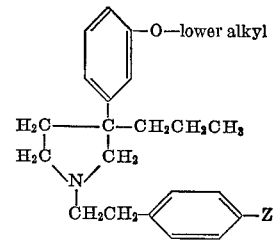

with an acidic reagent capable of cleaving the ether linkage; where Z is as defined before. The treatment with an acidic reagent is followed, when necessary, by decomposition of an intermediate aluminum or boron complex which may be formed. Some examples of suitable acidic reagents are hydriodic acid, hydrobromic acid, hydrogen bromide in acetic acid, aluminum chloride in carbon disulfide, aluminum chloride in nitrobenzene, aluminum bromide in benzene, pyridine hydrochloride, and boron tribromide. The preferred acidic reagent is 48% (constant boiling) hydrobromic acid, or boron tribromide. With hydrobromic acid it is preferred to use a large excess of this reagent as a solvent. An additional solvent is not necessary, and the reaction is commonly carried out for from 1 to 3 hours at the reflux temperature, although if desired, a reaction time of 30 minutes to 16 hours at about 50 to 175° C. can be used. In the case of boron tribromide it is customary to carry out the reaction in an unreactive solvent such as a hydrocarbon or a halogenated hydrocarbon, a preferred solvent being methylene chloride. At least the calculated amount and preferably a moderate excess of boron tribromide is used. With this reagent the usual time and temperature of the reaction are 15 minutes to 12 hours at —60 to +50° C. It is preferable to conduct the reaction at about —40 to —60° C. for about 30 minutes and then allow the reaction mixture to warm to room temperature over a period of 1 to 3 hours. The product is formed as a boron complex which is then decomposed with a hydroxylic solvent such as methanol. The product is isolated directly as an acid-addition salt, or following adjustment of the pH as required, as the free base or as a phenolic salt.

The lower alkyl ethers required as starting materials in the foregoing process can be prepared by any of a variety of methods. For example, a 3-(m-lower alkoxyphenyl)-3-propylpyrrolidine is reacted with phenethyl bromide in the presence of potassium carbonate and dimethylformamide to give a 1-phenethyl-3-(m-lower alkoxyphenyl)-3-propylpyrrolidine. Alternatively, a 3-(m-lower alkoxyphenyl)-3-propylpyrrolidine is reacted with p-nitrophenethyl bromide in the presence of potassium carbonate and dimethylformamide and the resulting 1-(p-nitrophenethyl) - 3 - (m - lower alkoxyphenyl) - 3-propylpyrrolidine is reacted with a reducing agent to give a 1-(p-aminophenethyl)-3-(m-lower alkoxyphenyl)-3-propylpyrrolidine.

Further in accordance with the invention, the phenols of the invention, that is, the compounds wherein R represents hydrogen, and salts thereof, can be produced by reacting a compound having in free base form the formula

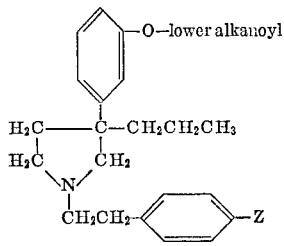

with a hydrolytic agent; where Z is as defined before. Some examples of suitable hydrolytic agents are aqueous solutions of bases or acids. A preferred agent is an aqueous solution of an alkali metal hydroxide or carbonate. It is desirable to use also an additional solvent, preferably a high proportion of a lower alkanol such as methanol, ethanol, or isopropyl alcohol. At least the calculated amount and preferably up to a considerable excess of the hydrolytic agent is used. While the time and temperature of the reaction are not critical, it is customary to carry out the hydrolysis at a temperature of from 15 to 150° C., or at the reflux temperature, for from 15 minutes to 48 hours, the longer reaction times being used at the lower temperatures. The preferred conditions are to heat the reactants in an aqueous lower alkanol at the reflux temperature for from 1 to 3 hours. The product is isolated as the phenolate salt, as the free phenol, or as an acid-addition salt by adjustment of the pH as required.

Still further in accordance with the invention, esters of the invention, that is, compounds wherein R represents lower alkanoyl, and salts thereof, can be produced by reacting a pyrrolidine compound of the formula

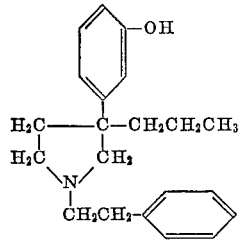

or a reactive derivative thereof, with a lower alkanoic acid or a reactive derivative thereof. Some examples of suitable reactive derivatives of the pyrrolidine compound are the phenolate salts and acid-addition salts. Some examples of suitable reactive derivatives of the lower alkanoic acid are the acid halides and the acid anhydride. At least approximately the calculated amount and preferably an excess of the lower alkanoic acid or its reactive derivative is used. While the reaction can be run without an additional solvent, it is customary to employ an unreactive solvent. Some examples of suitable solvents are tertiary amines such as triethylamine, N,N-dimethylaniline, quinoline, and pyridine; ethers such as dibutyl ether, tetrahydrofuran, and dioxane; hydrocarbons, halogenated hydrocarbons; and tertiary amides. The reaction is preferably conducted in the presence of an acidic or basic catalyst. When the reactant is a lower alkanoic acid, a suitable catalyst is a mineral acid. When the reactant is an acid anhydride, a suitable catalyst is a tertiary amine. A preferred medium in which to carry out the reaction is an acid anhydride in pyridine, where the pyridine functions both as solvent and as catalyst. The time and temperature of the reaction are not critical but in general a higher temperature and a longer reaction time are used when a lower alkanoic acid is the reactant rather than one of its reactive derivatives. With an acid anhydride in pyridine solution it is customary to carry out the reaction at a temperature of 75–150° C. for from 30 minutes to 6 hours, although temperatures as low as room temperature and below can be used if the reaction time is lengthened to approximately 24–48 hours. The product is isolated either as the free base or as an acid-addition salt by adjustment of the pH as required.

Yet further in accordance with the invention, the primary amines of the invention, that is, the compounds wherein Z represents amino, and salts thereof, can be produced by reacting a compound having in free base form the formula

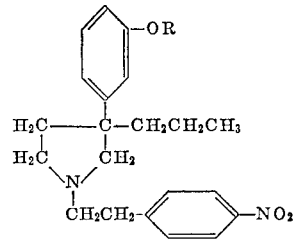

with a reducing agent; where R is as defined before. The reduction can be carried out either by catalytic hydrogenation or by mild chemical reducing agents capable of causing reduction of the nitro group to an amino group. When the process is carried out by catalytic hydrogenation, some suitable catalysts are noble metal catalysts such as platinum and palladium, including their oxides and hydroxides, optionally supported on a carrier. Palladium on charcoal is a preferred catalyst. Some examples of suitable solvents for the reaction are water; lower alkanols; ethers; and tertiary amides. A preferred solvent is a lower alkanol such as ethanol. When the starting material is a free phenol, it is preferable to add a small amount of an aqueous mineral acid to the reaction mixture. The hydrogenation proceeds readily at room temperature and a hydrogen pressure of 1 to 5 atmospheres and thus while higher temperatures and pressures can also be used they are unnecessary. Chemical reducing agents can also be used; for example stannous chloride can be used as a reducing agent especially when the starting material is a free phenol. The product is isolated as a phenolate salt, as the free base, or as an acid-addition salt by adjustment of the pH as required.

The free bases of the invention form acid-addition salts with any of a variety of inorganic and organic acids. Pharmaceutically - acceptable acid - addition salts are formed by reaction with such acids as hydrochloric, hydrobromic, sulfuric, phosphoric, acetic, succinic, citric, maleic, and pamoic acids. Then phenols of the invention also form phenolate salts with any of a variety of bases such as sodium hydroxide, potassium carbonate, and strongly-basic amines. The free bases and the salt forms are interconvertible by adjustment of the pH. They differ in solubility properties but in general are otherwise equivalent for the purposes of the invention. If desired, the compounds of the invention can also be obtained in optically active forms by using an optically active pyrrolidine derivative as starting material, or by resolving an optically inactive final product by fractional crystallization of a salt formed with an optically active acid.

The compounds of the invention are useful as pharmacological agents and as chemical intermediates. They are of particular value as analgesic agents because they have the ability to relieve severe pain without producing the side effects commonly associated with the use of alkaloidal analgesics. The compounds can be administered either orally or parenterally but oral administration is preferred. A special advantage of the particular compounds of this invention is that they exhibit unexpectedly high analgetic potency. Preferred compounds of the invention are 1-(p-aminophenethyl)-3-(m-hydroxyphenyl)-3-propylpyrrolidine and 1-phenethyl-3-(m-hydroxyphenyl)-3-propylpyrrolidine, especially in free form and in the form of their pharmaceutically-acceptable acid-addition salts. These compounds have much higher pain relieving activity than other analgetic agents of related chemical structures.

The invention is illustrated by the following examples.

EXAMPLE 1

A mixture of 30 g. of 1-phenethyl-3-(m-methoxyphenyl)-3-propylpyrrolidine and 75 ml. of 48% hydrobromic acid is heated under reflux for 2 hours and then distilled to dryness under reduced pressure to give a residue of 1-phenethyl-3-(m-hydroxyphenyl) - 3 - propylpyrrolidine hydrobromide. For conversion to the free base, this product is dissolved in 100 ml. of water and the solution is made slightly basic with aqueous sodium carbonate and extracted with ether. The ether extract is washed with water, dried, and evaporated to give a residue of 1-phenethyl-(m - hydroxyphenyl) - 3 - propylpyrrolidine; M.P. 138–140° C. following crystallization from benzene-petroleum ether. The hydrochloride is obtained by dissolving the free base in ether and adding hydrogen chloride. A citrate is obtained by mixing methanolic solutions of the free base and citric acid, and concentrating to a small volume. The sodium and potassium salts are obtained by adding the calculated amount of sodium hydroxide and of potassium hydroxide to solutions of the free base in aqueous ethanol, and evaporating to dryness.

The starting material can be obtained as follows. A mixture of 30 g. of 3-(m-methoxyphenyl)-3-propylpyrrolidine, 30 g. of phenethyl bromide, 45 g. of potassium carbonate and 250 ml. of dimethylformamide is stirred at room temperature for 16 hours. The mixture is diluted with 700 ml. of water and extracted with ether. The ether extract is washed with water, dried, and evaporated to give a residue of 1-phenethyl-3-(m-methoxyphenyl)-3-propylpyrrolidine as an oil; B.P. 178–184° C. at 0.5 mm. The hydrochloride is obtained by treating an ethereal solution of the free base with dry hydrogen chloride; M.P. 169–171° C.

EXAMPLE 2

A solution of 6.0 g. of 1-phenethyl-3-(m-hydroxyphenyl)-3-propylpyrrolidine in 50 ml. of pyridine and 30 ml. of acetic anhydride is heated under reflux for 2 hours and then distilled almost to dryness under reduced pressure. The residue is dissolved in benzene and the solution is washed with dilute aqueous sodium carbonate, dried, and evaporated to give a residue of 1-phenethyl-3-(m-acetoxyphenyl)-3-propylpyrrolidine; B.P. 192–202° C. at 0.4 mm. The hydrochloride is obtained by treating a solution of the free base in ether with hydrogen chloride; M.P. 147–149° C.

By the foregoing procedure, with the substitution of an equivalent amount of propionic anhydride for the acetic anhydride, the product is 1-phenethyl-3-(m-propionyloxyphenyl)-3-propylpyrrolidine.

By the foregoing procedure, with the substitution of an equivalent amount of butyric anhydride for the acetic anhydride, the product obtained is 1-phenethyl-3-(m-butyryloxphenyl)-3-propylpyrrolidine.

EXAMPLE 3

A mixture of 12.4 g. of 1-(p-nitrophenethyl)-3-(m-hydroxyphenyl)-3-propylpyrrolidine hydrobromide, 250 ml. of ethanol, 6 ml. of 36% hydrochloric acid, and 1.0 g. of 10% palladium on charcoal catalyst is shaken in a hydrogen atmosphere at 40° C. and atmospheric pressure until the calculated amount of hydrogen has been consumed. The catalyst is removed by filtration and the filtrate evaporated under reduced pressure. The residue is dissolved in 200 ml. of water and the solution is neutralized with sodium bicarbonate. The insoluble 1-(p - aminophenethyl) - 3 - (m-hydroxyphenyl)-3-propylpyrrolidine which precipitates is collected and washed with water. The dihydrochloride is obtained by treating a solution of the free base in ethanol with hydrogen chloride; hydrated, M.P. 141–144° C.

The starting material can be obtained as follows. A mixture of 11 g. of 3-(m-methoxyphenyl)-3-propylpyrrolidine, 12.5 g. of p-nitrophenethyl bromide, 7 g. of potassium carbonate, and 50 ml. of dimethylformamide is stirred at room temperature for 16 hours and then diluted with 200 ml. of water and extracted with ether. The ether solution is extracted with several portions of 2 N hydrochloric acid and the aqueous acidic extract is made basic with aqueous sodium carbonate and extracted with ether. The ether extract is washed with water, dried, and evaporated to give a residue of 1-(p-nitrophenethyl)-3-(m - methoxyphenyl) - 3 - propylpyrrolidine. The hydrochloride is obtained by treating a solution of the free base in ether with hydrogen chloride; M.P. 102–104° C. following crystallization from isopropyl alcohol-ether.

With external cooling to maintain the temperature below —50° C., a solution of 18.9 g. of 1-(p-nitrophenethyl)-3-(m-methoxyphenyl)-3-propylpyrrolidine in 200 ml. of methylene chloride is treated with a sodium of 20 ml. of boron tribromide in 50 ml. of methylene chloride. The solution is stirred at —50° C. for an additional 30 minutes and then warmed to room temperature over a 2-hour period. The solution is evaporated under reduced pressure. The oily residue is stirred with 100 ml. of methanol at 0° C. and the methanol is removed by evaporation under reduced pressure. The residue is stirred with an additional 100 ml. of methanol at 40° C. and the methanol is again removed by evaporation under reduced pressure. The residual product is 1-(p-nitrophenethyl)-3-(m-hydroxyphenyl)-3-propylpyrrolidine hydrobromide; M.P. 109–110° C. following crystallization from isopropyl alcohol.

I claim:

1. A member of the class consisting of compounds of the formula

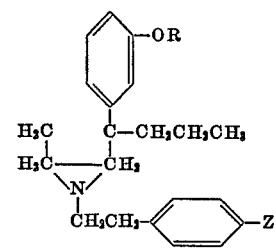

and pharmaceutically-acceptable salts thereof; where R is a member of the class consisting of hydrogen and lower alkanoyl; and Z is a member of the class consisting of hydrogen and amino.

2. A member of the class consisting of 1-(p-aminophenethyl) - 3 - (m - hydroxyphenyl) - 3 - propylpyrrolidine, 1-phenethyl-3-(m-hydroxyphenyl)-3-propylpyrrolidine, and pharmaceutically-acceptable acid-addition salts thereof.

3. A compound according to claim 2 which is 1-(p-aminophenethyl) - 3-(m-hydroxyphenyl)-3-propylpyrrolidine.

4. A compound according to claim 2 which is a pharmaceutically-acceptable acid-addition salt of 1-(p-aminophenethyl)-3-(m-hydroxyphenyl)-3-propylpyrrolidine.

5. A compound according to claim 2 which is 1-(p-aminophenethyl) - 3 - (m - hydroxyphenyl) - 3 - propylpyrrolidine dihydrochloride.

References Cited

UNITED STATES PATENTS

| 3,136,779 | 6/1964 | Cavalla | 260—326.3 |
| 3,144,463 | 8/1964 | Cavalla et al. | 260—326.3 |
| 3,149,123 | 9/1964 | Cavalla | 260—326.3 |
| 3,256,297 | 6/1966 | Cavalla et al. | 260—326.3 |

ALEX MAZEL, Primary Examiner

JOSE TOVAR, Assistant Examiner

U.S. Cl. X.R.

260—326.3; 424—274